United States Patent [19]
Schmidt et al.

[11] Patent Number: 5,937,196
[45] Date of Patent: Aug. 10, 1999

[54] COMPILING WITH PARTIAL COPY PROPAGATION

[75] Inventors: William Jon Schmidt; Edward Curtis Prosser; Robert Ralph Roediger, all of Rochester, Minn.

[73] Assignee: International Business Machines Corporation, Armonk, N.Y.

[21] Appl. No.: 08/933,705

[22] Filed: Sep. 19, 1997

[51] Int. Cl.⁶ ..................................................... G06F 9/45
[52] U.S. Cl. ........................................... 395/709; 395/708
[58] Field of Search ..................................... 395/709, 708

[56] References Cited

U.S. PATENT DOCUMENTS

| | | | |
|---|---|---|---|
| 4,843,545 | 6/1989 | Kikuchi | 395/707 |
| 5,790,867 | 8/1998 | Schmidt et al. | 395/709 |

OTHER PUBLICATIONS

Kourosh Gharachorloo, Vivek Sarkar, and John Hennessy, "A Simple and Efficient Implementation Approach for Single Assignment Languages", 1988 Lisp and Functional Programming Conference, pp. 259–268, Jul. 1988.

K. Gopinath and John L. Hennessy, "Copy Elimination in Functional Languages", Proceedings of the sixteenth annual ACM symposium on Principles of programming languages, pp. 303–314, 1989.

Peter Schnorf, Mahadevan Ganapathi and John L. Hennessy, "Compile–time Copy Elimination", Software—Practice and Experience vol. 23(11), pp. 1175–1200, Nov. 1993.

*Primary Examiner*—Tariq R. Hafiz
*Assistant Examiner*—Lisa Stevens
*Attorney, Agent, or Firm*—Wood, Herron & Evans, L.L.P.

[57] ABSTRACT

A compiler and method of compiling provide partial redundant copy elimination by eliminating copy statements having at least one eligible reachable use and at least one ineligible reachable use. To eliminate such statements, the used operand of each eligible use is replaced with the used operand in the copy statement, and the copy statement is duplicated prior to each ineligible use.

23 Claims, 8 Drawing Sheets

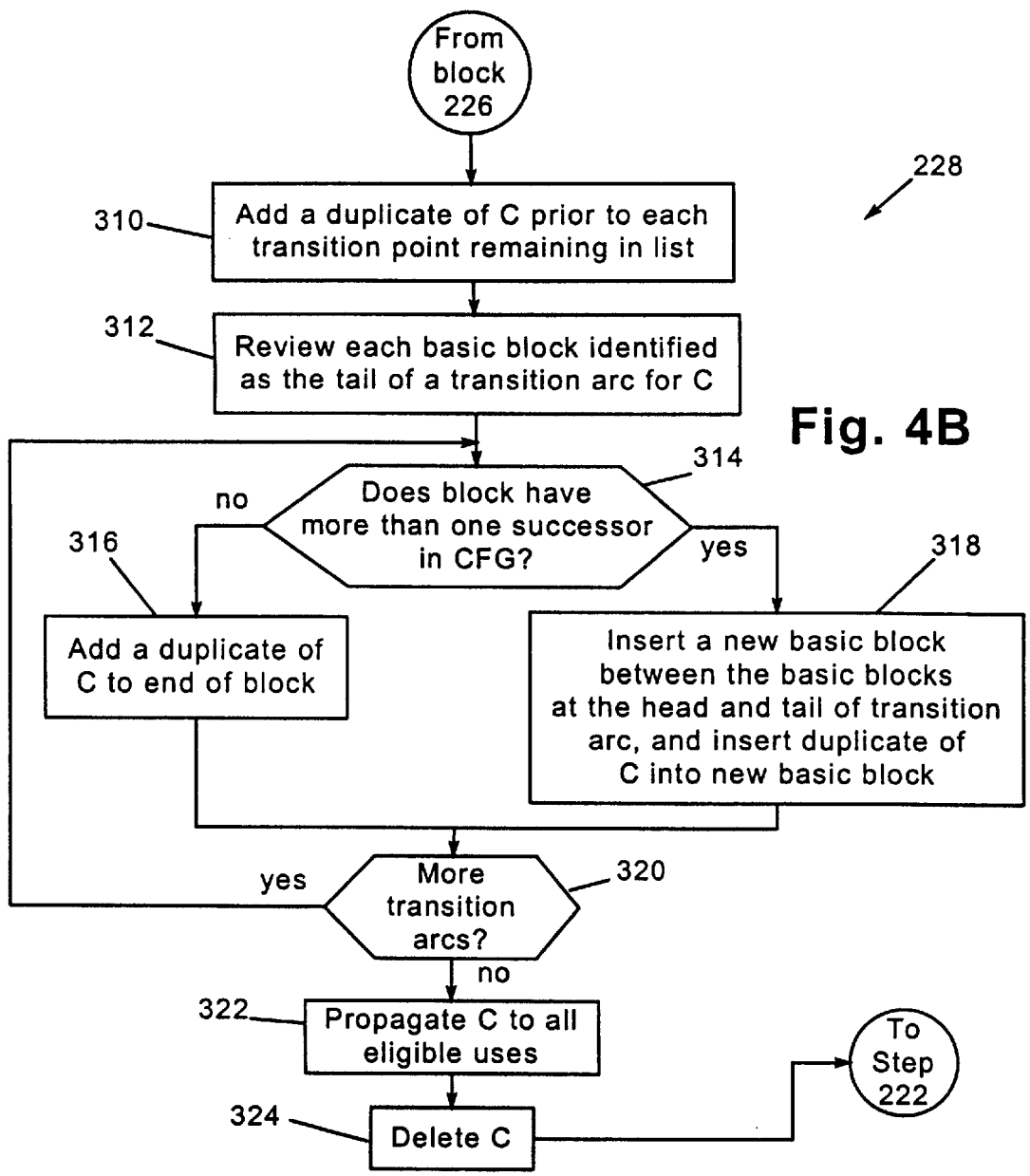

COMPILING WITH PARTIAL COPY PROPAGATION

FIELD OF THE INVENTION

The invention relates to optimizing compilers and methods of compiling. More particularly, the invention relates to optimizing routines used in compiling for eliminating copy statements.

BACKGROUND OF THE INVENTION

Compilers are generally used to transform one representation of a computer program procedure into another representation. Typically, but not exclusively, compilers are used to transform a human readable form of a program such as source code into a machine readable form such as object code.

One type of compiler is an optimizing compiler which includes an optimizer or optimizing module for enhancing the performance of the machine readable representation of a program. Some optimizing compilers are separate from a primary compiler, while others are built into a primary compiler to form a multi-pass compiler. Both types of compilers may operate either on a human readable form, a machine readable form, or any intermediate representation between these forms.

Many optimizing modules of compilers operate on intermediate representations of computer programs or procedures. Typically a program or procedure being translated is broken down into a series of "statements", each of which contains zero or more "operands" or "data items". A data item may be "defined", meaning that it is given a value by the statement, or "used", meaning that its value is fed into the computation represented by the statement. For example, the statement "x=y+z" defines x and uses y and z.

During optimization, possible paths of execution through a procedure may be represented by a control flow graph (CFG). Statements may be grouped together into basic blocks, which are maximal sequences of straight-line code. In other words, there is no way to branch into or out of a basic block except at the beginning or end. A CFG is a graph with one node for each basic block in the procedure. The CFG includes an arc from block A to block B if it is possible for block B to be executed immediately after block A has been executed.

A definition of a data item is said to "reach" a use of that data item if there is a path in the CFG from the definition to the use, along which the data item is not redefined. In this case the use is called a "reachable use" for the definition.

One optimization that is typically performed in many compilers is copy propagation, which attempts to remove unnecessary copy statements (e.g., of the form "T=S", where T is a target, or defined operand, and S is a source, or used operand) from a program. Such copy statements may be introduced by the programmer; however, they may also be generated by the compiler, e.g., when the compiler breaks down complex source code into its basic components, and during many optimization phases.

Conventional copy propagation techniques operate by looking for copy statements of the form "T=S" and examining each of the copy's reachable uses of the copy target T. A reachable use U is said to be "eligible" for propagation from such a copy C, provided that: (1) every path from the beginning of the program to U passes through C; (2) along every path from C to U, neither S nor T is redefined; and (3) replacing the use of T in U by a use of S would not violate any machine-specific idiomatic rules.

If all of C's reachable uses are eligible for propagation according to this definition, all reachable uses of T may be replaced with uses of S, and the copy statement "T=S" can be eliminated. This process of replacing the reachable uses and eliminating the copy is referred to as "propagating" the copy.

While this form of copy propagation has been found to be beneficial in enhancing the performance of computer programs, it has been found that conventional techniques are often too restrictive, and often miss potential optimizations. For example, conventional copy propagation does not allow a copy statement "T=S" to be removed when any of the reachable uses of "T" is ineligible for propagation. This is true even if only one of many uses of "T" is ineligible.

This limitation in traditional copy propagation is a substantial blockade to program optimization in some environments; therefore, a substantial need has arisen for copy propagation which goes beyond conventional copy propagation techniques to further optimize a computer program and thus improve the resulting performance of the program.

SUMMARY OF THE INVENTION

The invention addresses these and other problems associated with the prior art in providing copy propagation during compilation of a computer procedure. The routine performs steps above and beyond conventional copy propagation techniques to eliminate copy statements that cannot be propagated to all uses, by partially propagating the copy statement such as the above-described "T=S", only to the eligible uses of T. In this method, the copy is duplicated along paths where reachable uses of T are ineligible for propagation. The copy is then eliminated, and propagated to all eligible uses of T by replacing them with uses of S. Thus the original copy is eliminated even when there are some ineligible uses of T.

In specific embodiments, the routine identifies transition points where a previously available copy becomes unavailable. (A copy of "T=S" is available at a point if subsequent uses of T, if any, would be eligible for propagation; otherwise it is unavailable at that point.) The copy "T=S" is then replicated just before each of these transition points. The original copy is then partially propagated to the copy's eligible uses, resulting in a reduction of the number of statements on those paths without penalty to other paths along which ineligible uses occur.

Therefore, according to one aspect of the invention, there is provided a method of removing copy statements from a computer procedure, with each copy statement including a defined operand and a used operand. The method includes the steps of determining whether the defined operand of a first copy statement in the computer procedure has at least one eligible use and at least one ineligible use, and if so, removing the first copy statement from the computer procedure, duplicating the first copy statement at a location in the computer procedure prior to the ineligible use or uses, and replacing the defined operand of the eligible use or uses with the used operand of the first copy statement.

According to a further aspect of the invention, there is provided a method of compiling a computer procedure. The method includes the steps of: (a) optimizing the computer procedure to form an optimized representation, the computer procedure including at least one copy statement, the copy statement including a defined operand and a used operand, the optimizing step including the steps of: (1) determining whether every reachable use of its defined operand is eligible; (2) replacing the used operand in each eligible use with the used operand in the first copy statement and removing the first copy statement; (3) if step (a)(1) is false, but at least one of the copy's reachable uses is an eligible use, duplicating the first copy statement at one or more locations in the computer procedure prior to each ineligible use; and (b) generating an object code representation of the computer procedure from the optimized representation.

According to another aspect of the invention, there is provided a program storage device readable by a computer system, the program storage device tangibly embodying a program of instructions executable by the computer system to optimize a computer procedure by partially propagating copy statements during compilation of the computer procedure, the computer procedure having at least one copy statement that includes a defined operand and a used operand. The program includes an identifier that identifies a copy statement in the intermediate representation that defines an operand that has at least one eligible use and at least one ineligible use; and a partial copy propagator, responsive to the identifier, that removes the copy statement, replaces the used operand at each eligible use with the used operand in the copy statement, and duplicates the copy statement prior to each ineligible use.

According to an additional aspect of the invention, a method is provided for transferring a program product to a computer system. The method includes the steps of establishing a connection with the computer system; and transmitting the program product to the computer system. The program product is executable by the computer system to optimize a computer procedure by partially propagating copy statements during compilation of the computer procedure, the computer procedure having at least one copy statement that includes a defined operand and a used operand. The program product executes the steps of determining whether the defined operand of a first copy statement in the computer procedure has at least one eligible use and at least one ineligible use; and if so, removing the first copy statement, replacing the used operand at each eligible use with the used operand in the first copy statement, and duplicating the first copy statement prior to each ineligible use.

These and other advantages and features, which characterize the invention, are set forth in the claims annexed hereto and forming a further part hereof. However, for a better understanding of the invention, and the advantages and objectives attained by its use, reference should be made to the Drawing, and to the accompanying descriptive matter, in which there is described embodiments of the invention.

BRIEF DESCRIPTION OF THE DRAWINGS

FIGS. 4A and 4B are flow charts of specific operations performed as part of the partial copy propagation routine of FIG. 3.

DETAILED DESCRIPTION

Prior to discussing the operation of embodiments of the invention, a brief overview discussion of compilers and compiling techniques is provided herein.

Overview of Compilers

Compilers and the like are generally known in the art. See, for example, Alfred V. Aho, Ravi Sethi, and Jeffrey D. Ullman, *Compilers: Principles, Techniques, and Tools*, Addison-Wesley, copyright 1986, reprinted 1988, which is incorporated by reference herein.

One known type of compiler is a multi-pass optimizing compiler, which includes a front-end module for converting source code into an intermediate representation, and a back-end module which takes the intermediate representation and generates object code.

The front-end module of a multi-pass optimizing compiler typically includes a lexicographic analyzer which identifies tokens or key words in the source code, and a parser which analyzes the program statement by statement. The parser typically uses a context-free grammar to determine if program statements satisfy a set of grammar rules, and builds constructs. The parser then generates an intermediate representation using an intermediate code generator.

The back-end module of a multi-pass optimizing compiler typically includes an optimizer or optimizing module which operates on the intermediate representation to generate a revised or optimized intermediate representation. Several different optimizations may be performed, including but not limited to local optimizations such as value numbering, elimination of redundant computations, register allocation and assignment, instruction scheduling to match specific machine characteristics, moving invariant code out of loops, strength reduction, induction variable elimination, and copy propagation, among others. The back-end module also includes a final code generator to generate the object code from the revised intermediate representation.

A compiler may reside within the memory of the computer system upon which the object code generated by the compiler is executed. Alternatively, a compiler may be a cross-compiler which resides on one computer system to generate object code for execution on another computer system. Either type of compiler may be used consistent with the invention.

One suitable back-end module for use with the invention is an AS/400 optimizing translator supplied with an AS/400 minicomputer, which is a common back-end module of an optimizing compiler. This product may be used with a front-end module such as the ILE C Compiler available from IBM, among others. It will be appreciated that other compilers are suitable for different languages and/or different hardware platforms, and may also be used in the alternative.

Computer System

Figure 1:
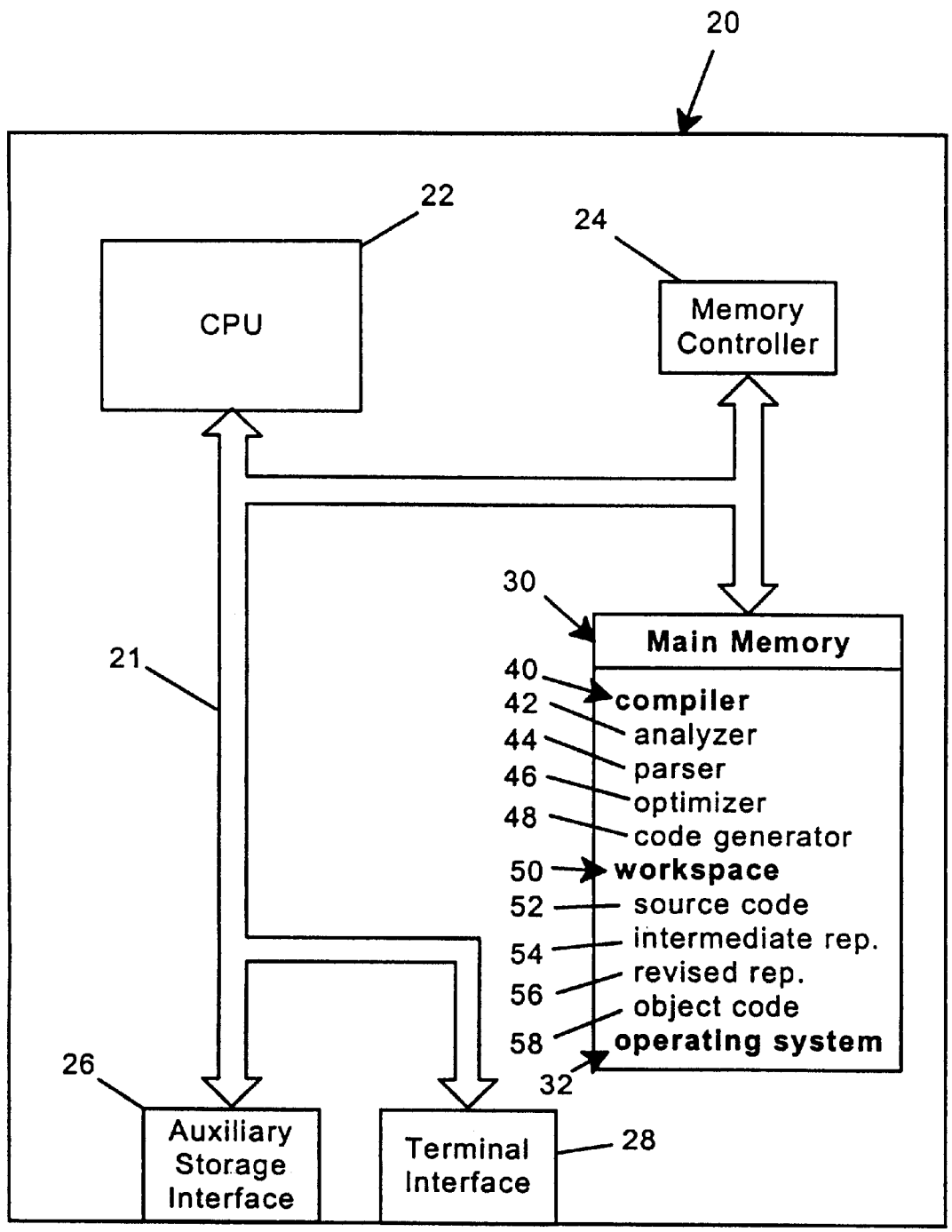
FIG. 1 is a block diagram of a computer system consistent with the invention.

Turning to the Drawing, wherein like numbers denote like parts throughout the several views, FIG. 1 shows a block diagram of a computer system 20 consistent with the invention. Computer system 20 is an IBM AS/400 minicomputer. However, those skilled in the art will appreciate that the mechanisms and apparatus consistent with the invention apply equally to any computer system, regardless of whether the computer system is a complicated multi-user computing apparatus or a single user device such as a personal computer or workstation. As shown in FIG. 1, computer system 20 includes a main or central processing unit (CPU) 22 connected through a system bus 21 to a main memory 30, a memory controller 24, an auxiliary storage interface 26, and a terminal interface 28.

Auxiliary storage interface 26 allows computer system 100 to store and retrieve information from auxiliary storage such as magnetic disk, magnetic tape or optical storage devices. Memory controller 24, through use of a processor separate from CPU 22, moves information between main memory 30, auxiliary storage interface 26, and CPU 22. While for the purposes of explanation, memory controller 24 is shown as a separate entity, those skilled in the art understand that, in practice, portions of the function provided by memory controller 24 may actually reside in the circuitry associated with CPU 22 and main memory 30. Further, while memory controller 24 of the embodiment is described as having responsibility for moving requested information between main memory 30, auxiliary storage interface 26 and CPU 22, those skilled in the art will appreciate that the mechanisms of the present invention apply equally to any storage configuration, regardless of the number and type of the storage entities involved.

Terminal interface 28 allows system administrators and computer programmers to communicate with computer system 20, normally through programmable workstations. Although the system depicted in FIG. 1 contains only a single main CPU and a single system bus, it will be understood that the invention also applies to computer systems having multiple CPUs and buses.

Main memory 30 is shown storing a compiler 40 (comprising analyzer 42, parser 44, optimizer 46 and code generator 48) and operating system 32. Memory 30 also includes a workspace 50, which is shown storing a computer program in various stages of compilation, including a source code representation 52, an intermediate representation 54, an optimized representation 56 and object code 58. However, it should be understood that main memory 30 will not necessarily always contain all parts of all mechanisms shown. For example, portions of compiler 40 and operating system 32 will typically be loaded into caches in CPU 22 to execute, while other files may well be stored on magnetic or optical disk storage devices. Moreover, the various representations 52–58 of a computer program may not be resident in the main memory at the same time. Various representations may also be created by modifying a prior representation in situ. In addition, as discussed above, the front-end and back-end modules in some systems may be separate programs.

It will be appreciated that computer system 20 is merely an example of one system upon which the routines may execute. Further, as innumerable alternative system designs may be used, principles of the present invention are not limited to any particular configuration shown herein.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or elements embodying the various aspects of the present invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, magnetic tape, etc., and transmission type media such as digital and analog communications links.

Operation of Conventional Copy Propagation Routines

Partial copy propagation routines consistent with the invention may embody some standard techniques for eliminating some copy statements. For example, partial copy propagation routines may be implemented to operate during conventional copy propagation analysis. Consequently, to better explain the operation of the embodiments and the differences between these embodiments and conventional techniques, a brief discussion of a conventional copy propagation routine is provided herein, illustrated as COPY PROPAGATION routine 100 in FIG. 2. However, it will be appreciated that the partial copy propagation routines may also operate independently of any conventional copy propagation routines and approaches in the alternative.

Conventional copy propagation typically looks for copy statements that can be eliminated from a procedure without changing the procedure's semantics. When a copy "T=S" is propagated, all reached uses of the copy target or defined operand T are replaced with the copy source or used operand S, and the copy statement "T=S" is eliminated.

Suppose, for example, that the definition of T in a copy statement "T=S" reaches n uses of T, say in statements $U_1$, $U_2$ . . . , $U_n$. Conventional copy propagation permits copy statement "T=S" to be propagated only if, for each use $U_k$, all of the following are true:

The copy "T=S" is the only definition of T that reaches $U_k$.

Along every path from "T=S" to $U_k$, there is no intervening redefinition of the source data item S, to ensure that T and S represent the same value at $U_k$.

The use of T in $U_k$ is not ineligible for replacement because of machine-specific idiomatic rules. (For example, some machines have instructions that require the same data item to appear as both a use and a definition. Propagating a copy to the use would change the use without changing the definition, resulting in an illegal machine instruction form.)

Uses of T are typically divided into local and global uses. A "local use" of T is a reachable use that appears later in the same basic block as the copy "T=S". A "global use" of T is a reachable use that appears at some other location. Even if a copy is not eligible to be propagated to all of its global uses, it is legal under conventional copy propagation to replace all eligible local uses of T with the source data item S, although in doing so it is not possible to eliminate the original copy statement "T=S" if there are global uses of T.

One complicating factor is the second-order effects of propagating one copy on other copies. If a copy statement $C_1$ (e.g., "T=S") has been propagated to a use that happens to be in a second copy statement $C_2$ (e.g., a use "T'=T", that through propagation is converted to "T'=S") then copy statement $C_2$ can later be propagated to subsequent uses only if the original source of statement $C_1$ ("S") is available at each subsequent use. To describe this situation, for the purposes of discussion below, once statement $C_1$ has been propagated to copy statements $C_2$, . . . $C_n$, we say that each of statements $C_2$, . . . $C_n$ has "subsumed" copy $C_1$.

Figure 2:
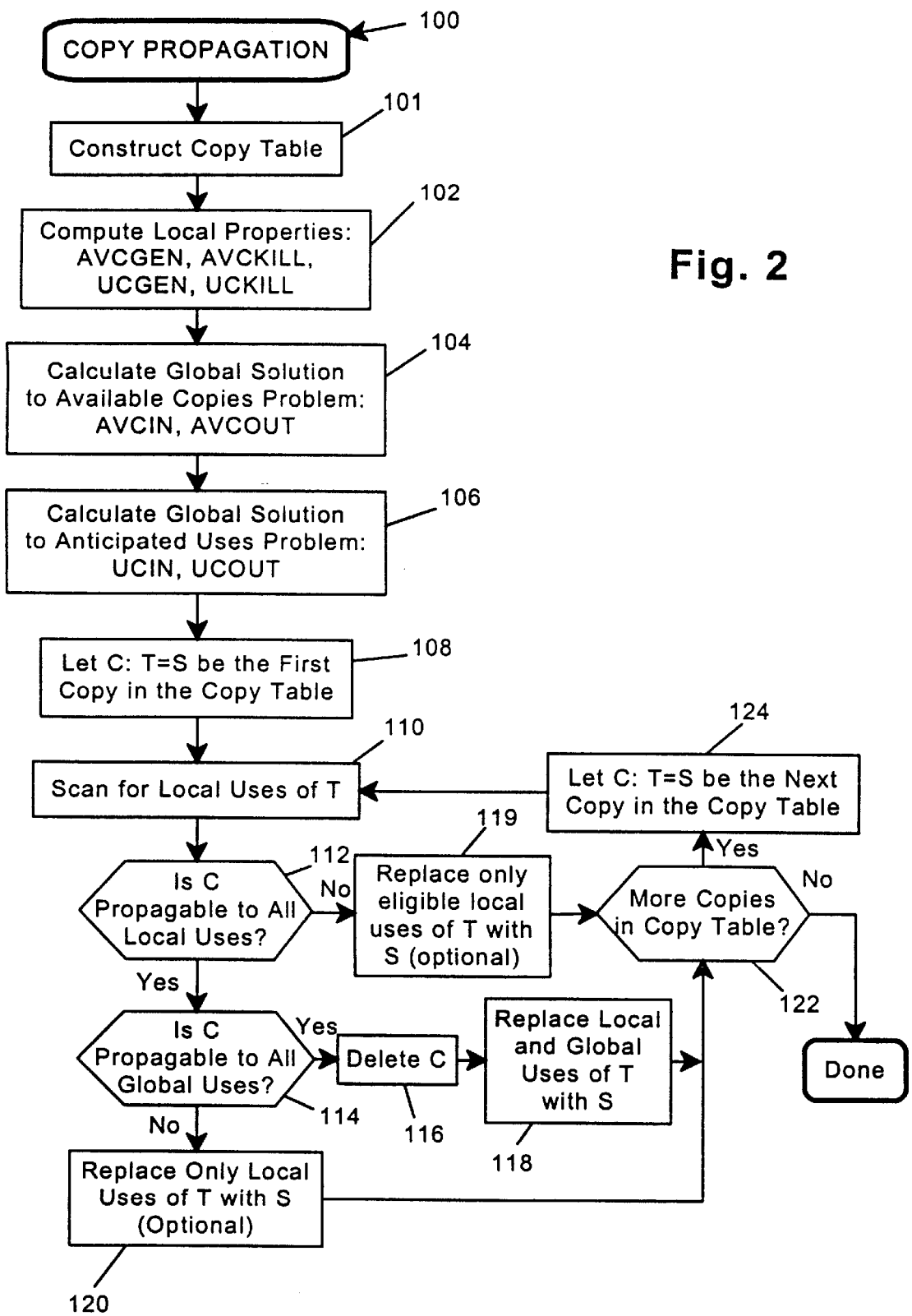
FIG. 2 is a flow chart illustrating the program flow of a conventional copy propagation routine.

Turning to FIG. 2, the first step (step 101) in COPY PROPAGATION routine 100 is to construct a copy table containing information about each copy statement in the procedure being compiled. Entries in the copy table are created by scanning each basic block from its first statement to its last statement. Basic blocks are visited according to a forward dataflow ordering, a manner which is well known in the art.

Next, in step 102, the compiler computes local properties for each basic block. This is a preparatory step performed prior to solving two global dataflow problems: available copies (AVC), and anticipated uses or use-chains (UC).

A solution to the available copies problem determines, for each point P in the procedure (where a "point" is a position between two statements), which copies are "available" at P in the following sense. A copy "T=S" is available at P if and only if: (1) along every path from "T=S" to P, neither T nor S is redefined; and (2) no other definition of T reaches P. Note that, if T or S is a data item that has aliases other names for the same data item—a redefinition of T or S may also occur under one of these aliases.

A solution to the anticipated uses problem provides a mapping, at each point P in the procedure, from data items to the uses that are reached, or anticipated, by definitions of those data items prior to point P.

Step 102 calculates the local properties for each basic block that are important in calculating solutions to the available copies and anticipated uses problems. The basic blocks in the control flow graph are visited in an arbitrary order. Within each block, a forward scan calculates local information for available copies, and a backward scan then calculates local information for use-chains. The properties AVCGEN[B] and AVCKILL[B] are then calculated for each block B, where:

AVCGEN[B]={C | C is a copy statement "T=S" that occurs in B, and neither T nor S is subsequently redefined in B}

AVCKILL[B]={C | C is a copy statement "T=S" that does not occur in B, and either T or S or both is defined in B}

UCGEN[B] and UCKILL[B] are mappings from data items to uses, such that, for any block B and data item D, UCGEN[B](D)={U | U is a statement in B that uses D, and D is not redefined in B prior to U}

UCKILL[B]={D | D is a data item defined in B}

The compiler next determines a global solution for the available copies problem in step 104. This is done by setting up and solving a series of 2b equations with 2b unknowns (where b is the number of basic blocks in the procedure) using a standard iterative technique such as is described in section 10.6 of *Compilers: Principles, Techniques, and Tools* (referenced above). The equations are formulated in terms of the available copies on entry to a block (AVCIN[B]) and the available copies on exit from a block (AVCOUT [B]), as well as the AVCGEN[B] and AVCKILL[B] constants calculated in step 102:

$$AVCIN[Init] = \phi$$

$$AVCIN[B] = \bigcap_{P \in pred(B)} AVCOUT[P], B \neq Init$$

$$AVCOUT[B] = (AVCIN[B] - AVCKILL[B]) \cup AVCGEN[B]$$

where pred(B) is the set of blocks that are predecessors of block B, and Init refers to a dummy block representing the entry point to the program.

As is well-known to those skilled in the art, this system of equations has many consistent solutions. When analyzing this problem it is desirable to obtain the largest solution consistent with the equations. For this reason AVCIN[B] and AVCOUT[B] are initialized to the universal set of copies for every block B (except Init). The compiler then solves the equations iteratively: it visits each block B according to a forward dataflow ordering, calculating first AVCIN[B] and then AVCOUT [B]. If, for any block, either AVCIN[B] or AVCOUT[B] changes during this process, the compiler iterates through the equations again. When no changes occur during an iteration, the compiler has found the largest possible fixed point consistent with the equations. This is the desired solution.

Next, in step 106, the compiler computes a global solution for the anticipated uses problem. For this problem, the equations are formulated in terms of the anticipated uses on entry to a block B (UCIN[B]) and the anticipated uses on exit from a block B (UCOUT[B]), as well as the UCGEN[B] and UCKILL[B] constants calculated in step 102. Note that UCIN[B] and UCOUT[B] are mappings from data items to sets of uses:

$$UCOUT[Exit](D) = \phi$$

$$UCOUT[B](D) = \bigcup_{S \in succ(B)} UCIN[S](D), B \neq Exit$$

$$UCIN[B](D) = UCGEN[B](D), \text{ if } D \in UCKILL[B]$$

$$UCIN[B](D) = UCGEN[B](D) \cup UCOUT[B](D),$$

$$\text{if } D \notin UCKILL[B]$$

where succ(B) is the set of blocks that are successors of block B, and Exit refers to a dummy block representing exit from the procedure.

Again, this system of equations has many consistent solutions. When analyzing this problem, it is desirable to obtain the smallest solution consistent with the equations. For this reason UCIN[B] and UCOUT[B] are initialized to the empty mapping for every block B. The equations are then solved iteratively in the same manner described above for available copies, except that the blocks are visited according to a backward dataflow order to produce the fastest possible convergence.

Next, in steps 108–124, the compiler scans through the copy table to determine which copy statements can legally be propagated. These steps comprise a loop that is executed once for each copy statement in the copy table. During each iteration, C represents the copy statement as a whole, T is the target data item or defined operand of the copy statement, S is the current source data item or used operand of the copy statement, and B is the basic block that contains C.

First in step 108, C is initialized to the first copy statement in the copy table. Then, in step 110, the compiler scans forward from C through the end of basic block B that contains C, building up a list of local uses of T. During this process, the compiler may discover that the copy is not propagable for one of two reasons. First, the copy is not propagable if a local use of T is found after an intervening definition of S (thus not all uses of T are reachable.) Second, the copy is not propagable if a local use of T is found that is ineligible for replacement because of machine-specific idiomatic rules. If a redefinition of T is found, the scan for local uses is terminated, and the copy is deemed to have no global uses.

If the copy is ineligible for propagation for any of the above reasons, after the scan in step 110, control passes through step 112, to an optional step 119, in which only those eligible local uses of T may be replaced with S, and then to step 122, effectively preventing propagation of the copy. In step 122, if more copies remain to be processed in the copy table, control passes to step 124 to select the next copy statement C in the table, and return to step 110.

If, at the end of the scan of the basic block B containing copy C, the copy has not been rejected for any of the above reasons, the set UCOUT[B](T) is consulted (step 114). As noted above, UCOUT[B](T) is a list of uses of T in blocks that succeed B. If the copy C has no global uses because of a subsequent redefinition of T in B, this list is ignored, and the result of step 114 is vacuously true. Otherwise, UCOUT [B](T) is scanned in step 114 to see whether all uses are reachable from the copy C, in the sense of available copies. For each use U, say in a block K, the compiler verifies: (1) the copy C is a member of AVCIN[K]; (2) all subsumed copies of C are members of AVCIN[K]; (3) neither T nor S is redefined in K prior to U; and (4) U is not ineligible for replacement because of machine-specific idiomatic rules. If any of these tests are failed, the copy is rejected.

If the copy was not rejected for any of its uses, then the original copy statement is eliminated in step 116, and uses of T are replaced by uses of S in all local and global uses of the copy (step 118). If any of the replaced global or local uses of T are themselves in copy statements, both the copy C and all of its subsumed copies become subsumed copies of the replaced global or local copy statement.

Otherwise, if the copy is rejected, control passes to step 120 and the copy is optionally propagated only to local uses that can legally accept the propagation. Both the copy C and all of its subsumed copies become subsumed copies of each of these local uses that are themselves copies. In some instances, this step may not optimize the code to a significant extent, and thus, this step is optional.

In either event of the outcome of step 114, control ultimately passes to steps 122 and 124 to process additional copy statements in the copy table. Once all statements in the table are completed, the routine terminates.

Figure 5:
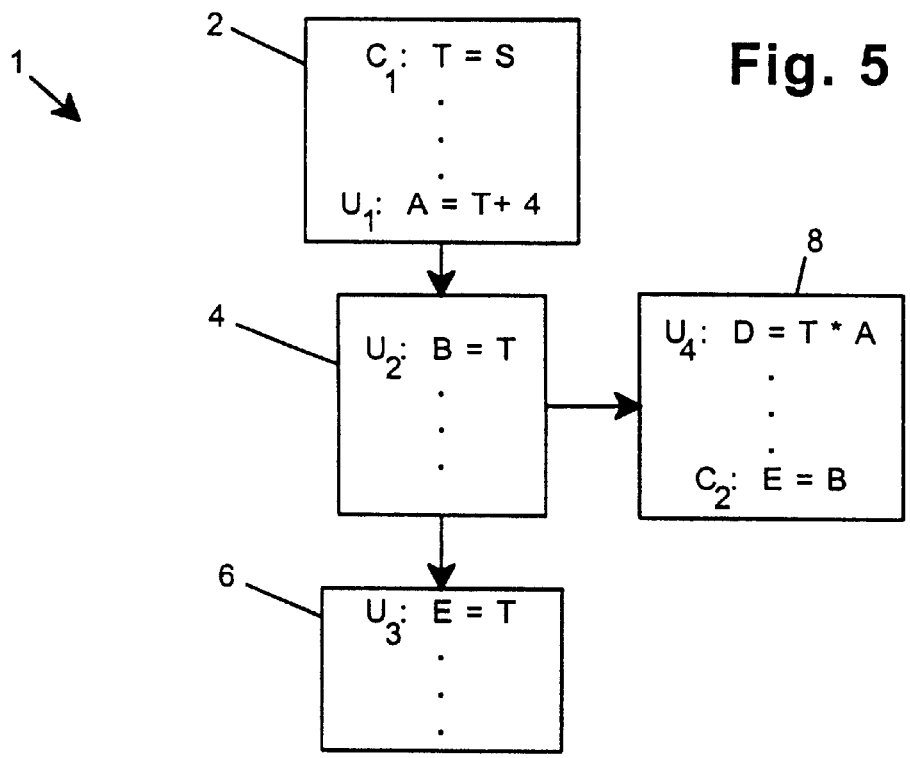
FIGS. 5, 6 and 7 are control flow graphs of exemplary computer procedures for illustrating the operation of the partial copy propagation routine of FIG. 3 versus a conventional copy propagation routine.

As an example of the operation of conventional routine 100, FIG. 5 shows a control flow graph (CFG) for a computer procedure 1 which includes four basic blocks 2, 4, 6 and 8. The local properties calculated in step 102 of routine 100 are:

AVCGEN(2) = {$C_1$}  AVCKILL(2) = {$U_2,U_3$}
AVCGEN(4) = {$U_2$}  AVCKILL(4) = {$C_2$}
AVCGEN(6) = {$U_3$}  AVCKILL(6) = {$C_2$}
AVCGEN(8) = {$C_2$}  AVCKILL(8) = {$U_3$}
UCGEN(2) = {S→{$C_1$}}  UCKILL(2) = {T,A}
UCGEN(4) = {T→{$U_2$}}  UCKILL(4) = {B}
UCGEN(6) = {T→{$U_3$}}  UCKILL(6) = {E}
UCGEN(8) = {T→{$U_4$}, A→{$U_4$}, B→{$C_2$}}  UCKILL(8) = {D,E}

Next, in steps 104 and 106, the global solutions to the available copies and anticipated uses problems are calculated. The initial values are:

AVCIN(2)={ }
AVCIN(x)={$C_1,U_2,U_3,C_2$} for all other blocks x≠2
AVCOUT(x)={$C_1,U_2,U_3,C_2$} for all blocks x
UCIN(x)=UCOUT(x)={ } for all blocks x After the dataflow equations are solved iteratively in steps 104 and 106 as described above, the resulting solutions are:

AVCIN(2)={ }
AVCOUT(2)={$C_1$}
AVCIN(4)={$C_1$}
AVCOUT(4)={$C_1,U_2$}
AVCIN(6)={$C_1,U_2$}
AVCOUT(6)={$C_1,U_2,U_3$}
AVCIN(8)={$C_1,U_2$}
AVCOUT(8)={$C_1,C_2,U_2$}
UCOUT(8)={ }
UCIN(8)={T→{$U_4$},A→{$U_4$},B→{$C_2$}}
UCOUT(6)={ }
UCIN(6)={T→{$U_3$}}
UCOUT(4)={T→{$U_3,U_4$},B→{$C_2$},A→{$U_4$}}
UCIN(4)={T→{$U_2,U_3,U_4$},A→{$U_4$}}
UCOUT(2)={T→{$U_2,U_3,U_4$},A→{$U_4$}}
UCIN(2)={S→{$C_1$}}

From these values, execution of the loop of steps 110–124 of routine 100 for copy statement $C_1$ in block 2 results in a determination that all reachable uses $U_1$, $U_2$, $U_3$ and $U_4$ of T are unique (i.e., they are only reached by $C_1$). Therefore, routine 100 replaces all uses of T with S and eliminates copy statement $C_1$, resulting in the use equations:

$U_1$: A=S+4
$U_2$: B=S
$U_3$: E=S
$U_4$: D=S*A

It is to be noted that both $U_2$ and $U_3$ will also be eliminated by routine 100 as they are processed as additional copy statements in the copy table. In particular, C is set to copy statement $U_2$, routine 100 eliminates this statement and replaces defined operand B with used operand S in statement $C_2$ (which becomes "E=S".)

Figure 6:
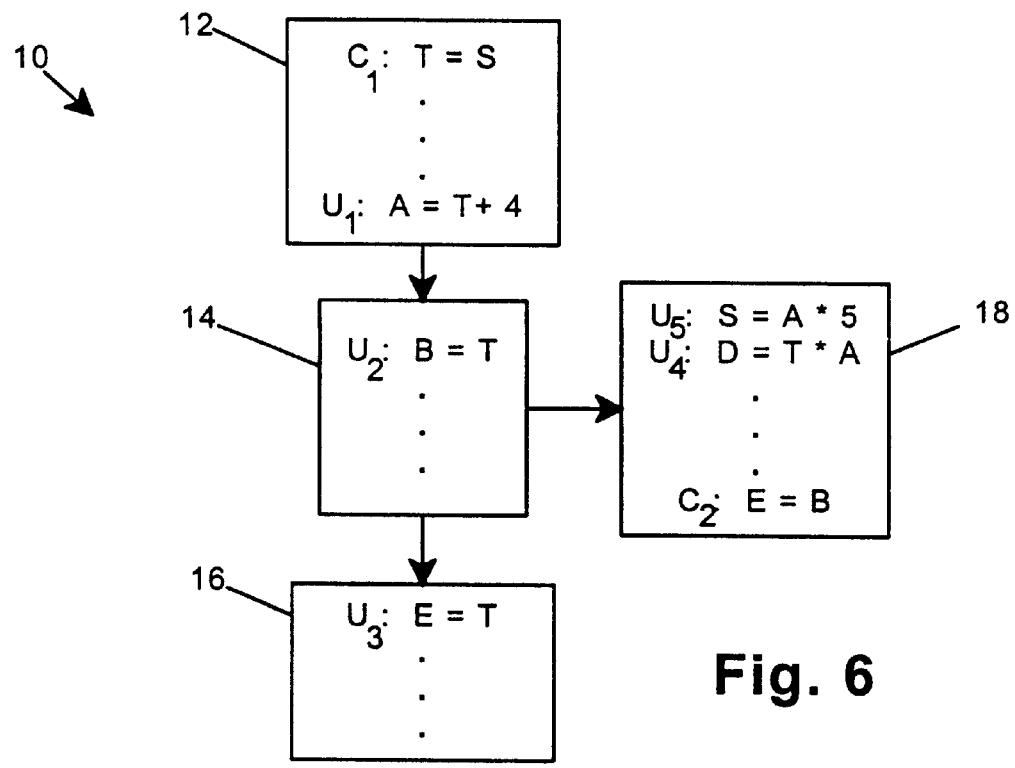

On the other hand, FIG. 6 illustrates the CFG of another computer procedure 10, which includes basic blocks 12, 14, 16 and 18, each of which is respectively identical to blocks 2, 4, 6 and 8 of procedure 1, with the exception that basic block 18 includes an additional statement $U_5$, "S=A* 5". As will be seen, this small change severely limits the optimization available from routine 100.

Calculation of local properties and global solutions to available copies and anticipated uses in steps 102–106 of routine 100 generates similar data to that described above for FIG. 5 (with array indices "2", "4", "6" and "8" above replaced by "12", "14", "16" and "18", as appropriate), and with the additions and exceptions below:

AVCKILL(18)={$C_1,U_3$}
UCKILL(18)={D,S,E}
AVCOUT(18)={$C_2,U_2$}
UCIN(18)={T→{$U_4$},A→{$U_4,U_5$},B→{$C_2$}}
UCIN(14)={T→{$U_2,U_3,U_4$},A→{$U_4,U_5$}}
UCOUT(12)={T→{$U_2,U_3,U_4$},A→{$U_4,U_5$}}
UCOUT (14)={T→{$U_3, U_4$}, B→{$C_2$}, A→{$U_4, U_5$}}

From this data, conventional routine 100 will not propagate copy statement $C_1$ at all because the use of T in $U_4$ appears after an intervening redefinition of S, and thus the use of T in $U_4$ is not eligible. Step 114 (FIG. 2) therefore determines that $C_1$ is not propagable to all global uses, and steps 116 and 118 are not executed for this statement. If the optional step 120 (FIG. 2) is executed to replace local uses of T with S, then only $U_1$ is replaced, resulting in the modified statement "A=S+4". The remaining global uses of T, in statements $U_2$, $U_3$ and $U_4$, however, are not affected by routine 100.

Figure 7:
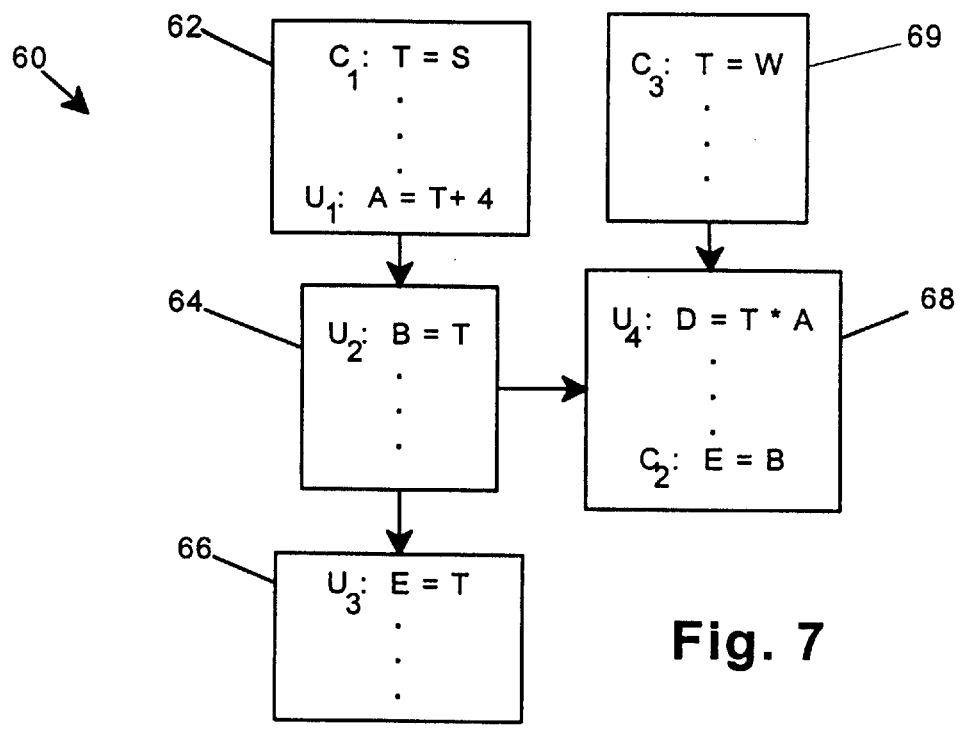

FIG. 7 illustrates the CFG of another computer procedure 60, which includes basic blocks 62, 64, 66 and 68, each of which is respectively identical to blocks 2, 4, 6 and 8 of procedure 1. In addition, procedure 60 includes an additional basic block 69, containing a redefinition of T in statement $C_3$, "T=W". As will be seen, this small change severely limits the optimization available from routine 100.

Calculation of local properties and global solutions to available copies and anticipated uses in steps 102–106 of routine 100 generates similar data to that described above for FIG. 5 (with array indices "2", "4", "6" and "8" above replaced by "62", "64", "66" and "68", as appropriate), and with the additions and exceptions below:

AVCGEN(69)={$C_3$}
AVCKILL(69)={$C_1,U_{21}U_3$}
UCGEN(69)={W→{C3}}
UCKILL(69)={T}
AVCIN(68)={ }
AVCOUT(68)={$C_2$}
UCOUT(69)={T→{U4},B→{C2},A-{U4}}
UCIN(69)={B→{C2},W→{C3},A-{U4}}

From this data, conventional routine 100 will not propagate copy statement $C_1$ at all because one of the reached uses ($U_4$ in block 68) is also reached by copy statement $C_3$. Step 114 (FIG. 2) therefore determines that $C_1$ is not propagable to all global uses, and steps 116 and 118 are not executed for this statement. If the optional step 120 (FIG. 2) is executed to replace local uses of T with S, then only U, is replaced, resulting in the modified statement "A=S+4". The remaining global uses of T, in statements $U_2$, $U_3$ and $U_4$, however, are not affected by routine 100.

As can be seen from the foregoing, conventional copy propagation routines such as routine 100 are severely limited, in that in many cases the unavailability of a copy at one use, or the non-uniqueness of a use, prevent copy propagation and potential optimizations of many computer procedures.

Operation of Partial Copy
Propagation Routines

On the other hand, the embodiments of the invention offer significant improvements over conventional copy propagation routines by looking for opportunities to partially propagate copies even where those copies cannot be propagated to all global uses. By doing so, some optimization may nonetheless be performed with respect to a copy statement even if not all uses of the defined operand in the copy statement are eligible for propagation.

Figure 3:
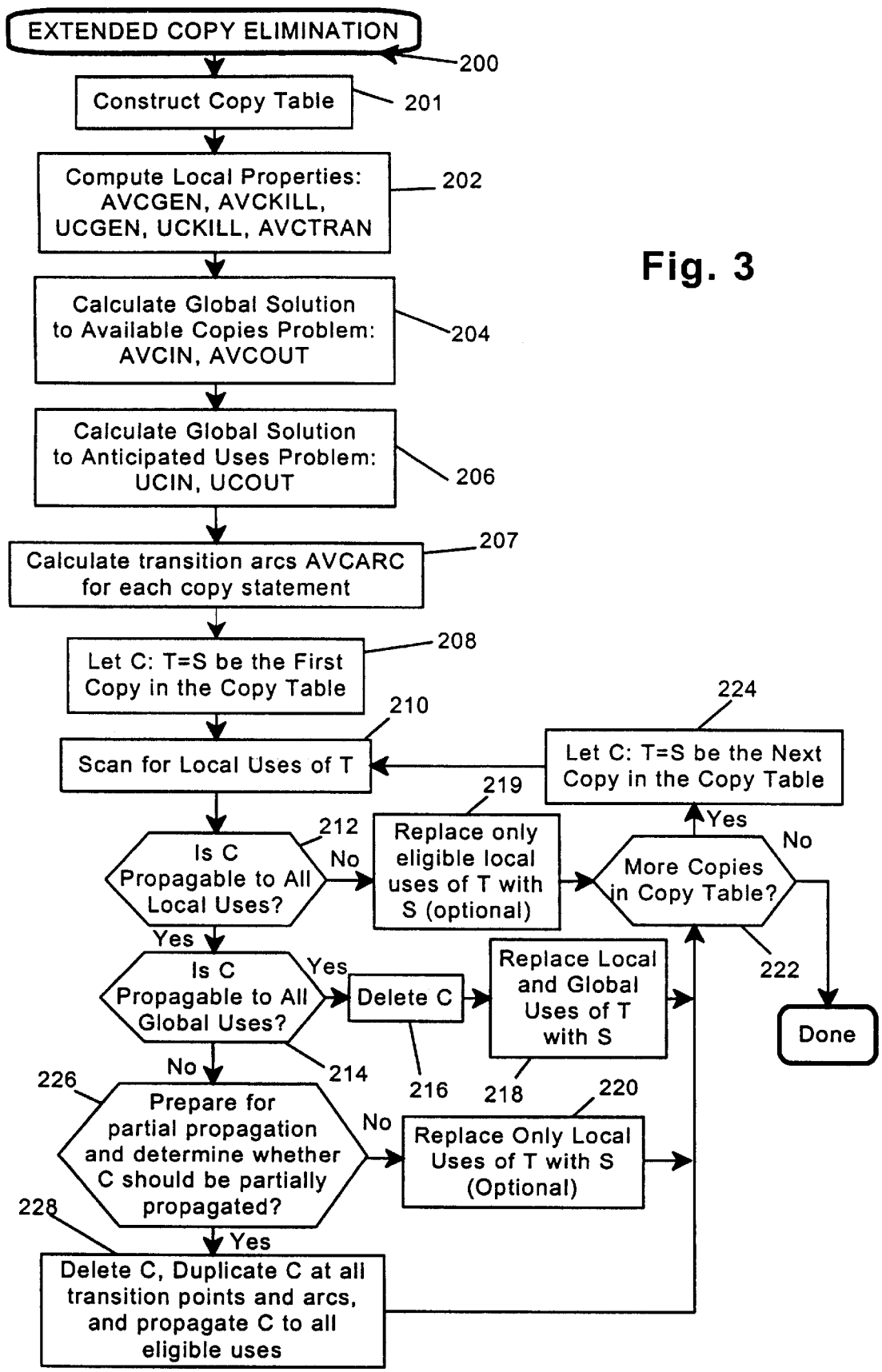
FIG. 3 is a flow chart illustrating the program flow of a partial copy propagation routine consistent with the invention, and for use in the computer system of FIG. 1.

A first embodiment of the invention, EXTENDED COPY ELIMINATION routine 200, is shown in FIG. 3. Much of this routine is similar to routine 100 of FIG. 2, with each step 2xx being identical in function to the corresponding step 1xx in FIG. 2. The primary differences are in step 202, and the addition of steps 207, 226 and 228 in routine 200 which implement the partial copy propagation features of the invention.

Essentially, routine 200 differs from routine 100 in that even when a copy statement is not fully propagable throughout a procedure because one of the uses of its defined operand is ineligible, routine 200 will perform additional analysis to determine if any of the eligible uses may be suitable for optimization, propagating the copy to those eligible uses, and duplicating the copy prior to the ineligible uses. This form of copy propagation is performed with minimal computational expense since it operates concurrently with conventional copy propagation.

In particular, in step 202, one additional property AVCTRAN[B] is computed for each basic block B. AVCTRAN[B] is a mapping from copy statements to statements in block B at which those copies become unavailable, such that, for any copy statement C, AVCTRAN[B](C)={U | U is the first statement in B that redefines the copy source in copy statement C, if there is no earlier redefinition in B of the copy target in copy statement C}.

(An example of a transition point is statement $U_5$ in block 18 of FIG. 6, which redefines the copy source S of statement $C_1$; thus, AVCTRAN[18] ($C_1$)={$U_5$}.) At step 202, global availability has not yet been calculated, and therefore, the statements recorded in AVCTRAN[B] are those that would be transition points provided that the copy C is available on entry to block B. At most one potential transition point is recorded for a copy in each block, since only the first killing statement in a block can cause a copy to transition from available to unavailable. Also, the liveness of the copy target is only checked within block B; since only a few copies are typically eligible for partial propagation, a complete check on the liveness of the copy target at a potential transition point is deferred until later.

After steps 204 and 206, which compute the available copies for each block and the anticipated uses in the manner described above, in an additional step 207, the CFG is scanned to find transition arcs AVCARC[C] for each copy statement C with target T, such that AVCARC[C]={A | A is an arc in the CFG from block G to block H, where C∈AVCOUT[G]−AVCIN[H] and T∈UCIN[H]}

Thus, a transition arc for a copy C is an arc on the CFG from a block G to a block H, where copy C is available on exit from G, but unavailable upon entry to H. (An example of such an arc is the arc from block 64 to block 68 in FIG. 7—copy $C_1$ is available upon exit from block 64 but unavailable upon entry to block 68; thus AVCARC[$C_1$]={$A_{64-68}$}.) Furthermore, C's copy target must also be live on entry to H (since otherwise C's availability at H is irrelevant).

From the data AVCTRAN and AVCARC accumulated in steps 202 and 207, partial propagation of copies can be performed, if a copy C is found not to be globally propagable.

Specifically, if in step 214, it is found that copy C is not propagable to all of its global uses, then routine 200 proceeds to step 226, in which it prepares for partial propagation of C, including the step of determining whether C should be partially propagated. If C should be partially propagated (as discussed below), routine 200 proceeds to step 228, in which routine 200 deletes copy C, duplicates C at all transition points and transition arcs, and propagates C to all eligible uses of T. After step 228, routine 200 proceeds to step 222 to evaluate the next copy. If, however, routine 200 determines in step 226 that partial propagation should not be performed (for reasons discussed below), routine 200 proceeds to optional step 220 and propagates only to local uses, and then proceeds to step 228.

Figure 4A:
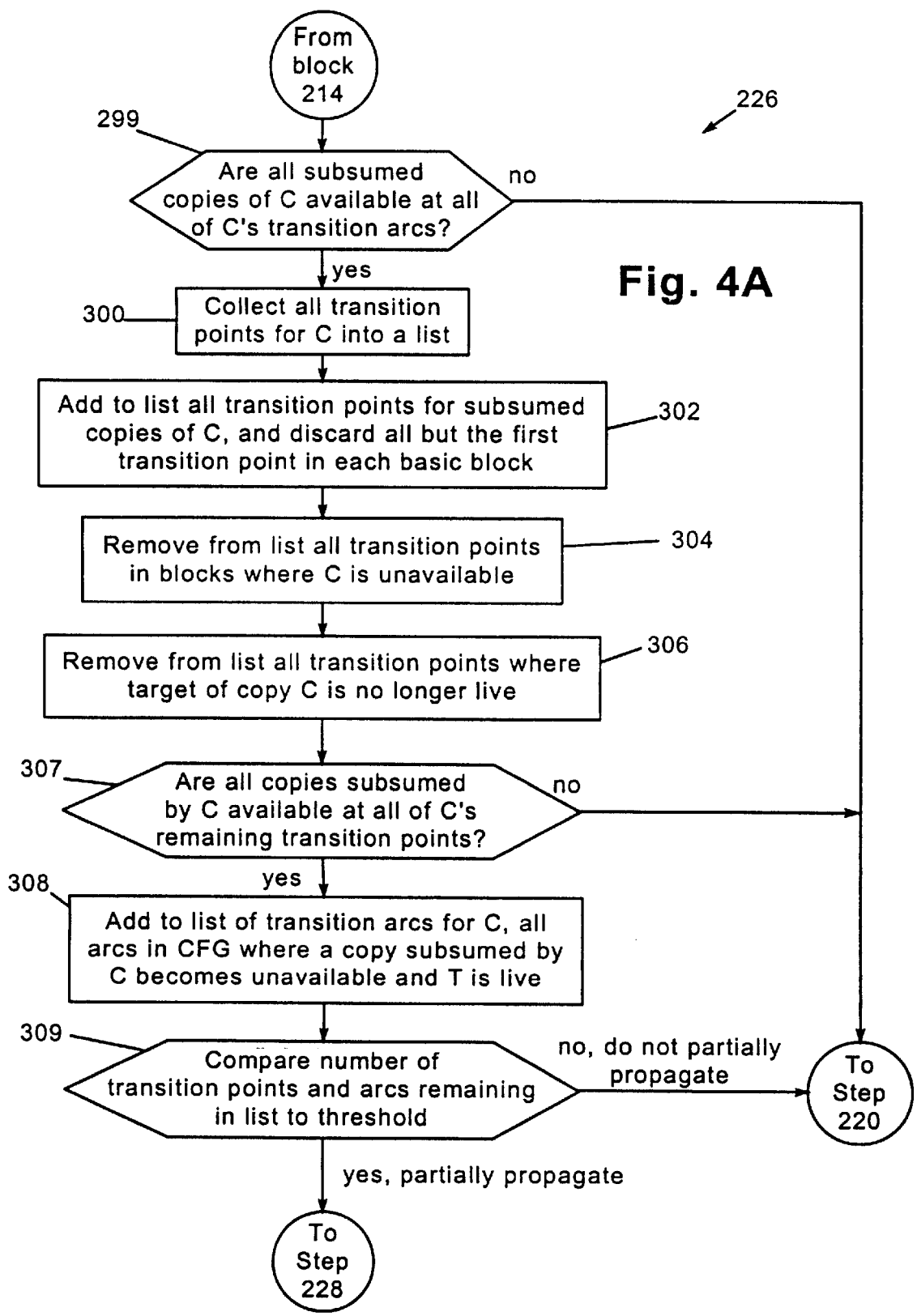

Referring now to FIG. 4A, details of step 226 may be elaborated. In step 226, preparations are made for partial copy propagation. The first step 299 is to determine whether there are copies subsumed by the copy C which will make partial propagation of C illegal. Specifically, step 299 determines whether all copies subsumed by C are available at the beginning and end of all of C's transition arcs. Since partial propagation of C requires generating a duplicate of C at the beginning or end of C's transition arcs, any copies subsumed by C must be available at these points. If any of the copies subsumed by C are not available at one of C's transition arcs, then partial propagation cannot be performed, and processing proceeds to step 220.

The next step 300 is to collect all transition points for copy C into a list. That is, all values of AVCTRAN[B](C) for all blocks B are collected. Next, in step 302, this list is expanded by adding all transition points for all subsumed copies of C (that is, all values of AVCTRAN[B](C') for all blocks B and all subsumed copies C' of C).

The list of potential transition points. collected in this manner is then processed in the following steps to identify all of the actual transition points for copy C. To do this, in step 304, all transition points in the list where C (or the appropriate subsumed copy C' of C) is unavailable, are removed from the list. That is, a transition point for a copy or subsumed copy C in a block B is kept in the list only if C∈AVCIN[B]. Next, in step 306, a determination is made whether the target T of copy C is live following each transition point, that is, whether there exists a path from the transition point to a use of T along which T is not redefined. If T is not live following a give transition point, that transition point is removed from the list.

After step 306, it is necessary to evaluate the effect of any copies which have been subsumed into C. Specifically, step 307 determines whether all copies subsumed by C are available at all of C's transition points. As noted above, since partial propagation of C requires generating a duplicate of C at each of its transition points, any copies subsumed by C must be available at these points. If any of the copies subsumed by C are not available at one of C's transition points, then partial propagation cannot be performed, and processing proceeds to step 220.

If, however, the test of step 307 is passed, processing proceeds to step 308. Step 308 evaluates the effect of transition arcs of copies subsumed by C. Specifically, step 308 identifies all arcs in the CFG at which a copy subsumed by C becomes unavailable while the target T' of the subsumed copy is live. These arcs will be referred to as "subsumed transition arcs". If there are subsumed transition arcs, which are not already identified in the list of transition arcs for C, the subsumed transition arcs are added to the list of transition arcs for C. This step ensures that partial propagation of C is performed legally for C's subsumed copies as well as for C itself.

After step 308, the remaining lists of transition points and arcs identify all of the actual locations where C or its subsumed copies become unavailable. At this point, it is possible to evaluate whether partial propagation of C is worthwhile. Under certain circumstances, partial copy propagation may not reduce the path length along any path (although neither will it increase the path length). However, partial copy propagation may substantially increase the total size of the program, due to the number of duplicates of the copy statement C that must be inserted at transition points as described below. Accordingly, in one embodiment, an optional step 309 may be included in the partial propagation routine. At step 309, a decision is made whether to effect partial copy propagation, by comparing to a threshold value, the number of transition points and/or arcs, which represents the number of duplicates of statement C that must be added to the program to effect partial copy propagation. If the threshold is exceeded, partial copy propagation can be skipped by proceeding directly to step 220, as described above. If the threshold is not exceeded, partial copy propagation is performed, by proceeding from step 309 to step 310, FIG. 4B, described below. Other tests of the profitability of performing partial copy propagation may be employed within the spirit and scope of the present invention.

It should be noted that although partial copy propagation may result in slight code bloat (increase in overall object code size), this code bloat is offset by a decrease in register pressure (a decrease in the number of registers carrying live data at any one time) which can aid in other optimizations. Accordingly, step 309 may be considered optional, and in one embodiment of the present invention, step 309 is bypassed, and partial copy propagation is always performed by proceeding directly from step 308 to step 310.

Referring now to FIG. 4B, to perform partial copy propagation, routine 200 performs step 310 through 324, which collectively represent the activities of step 228 in FIG. 3.

In step 310, duplicates of copy C are placed just prior to each transition point remaining in the list generated in the preceding steps. Then, in step 312 through 320, duplicates of copy C are also placed along each transition arc. Specifically, beginning with step 312, each basic block identified as the tail of a transition arc for copy C is reviewed. As to each block, in step 314, it is determined whether the block has more than one successor in the CFG. If not, in step 316, a duplicate of copy C is added to the end of the block. If so, in step 318, a new basic block is generated and inserted into the CFG between the two blocks identified by the transition arc, so that all control flow along that arc passes through the new block. Then, a duplicate of copy statement C is inserted into the new basic block.

After thus reviewing a basic block, processing passes to step 320, and if there are additional transition arcs to review, returns to step 314. When all transition arcs have been reviewed, processing passes to step 322.

In step 322, the target of copy statement C is propagated to all eligible uses of C. Then, as a final step 324, the original copy statement C is deleted, and processing proceeds to step 222 of FIG. 3.

Figure 8:
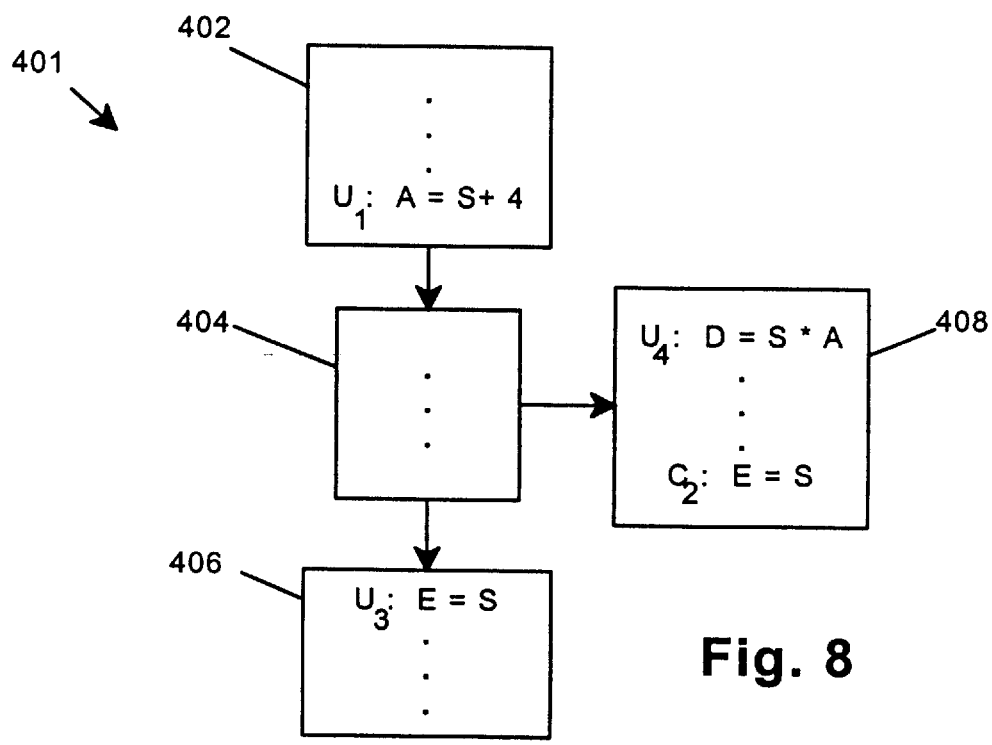
FIGS. 8, 9 and 10 are control flow graphs of the exemplary computer programs of FIGS. 5, 6 and 7 after undergoing the partial copy propagation routine of FIG. 3.
Figure 9:
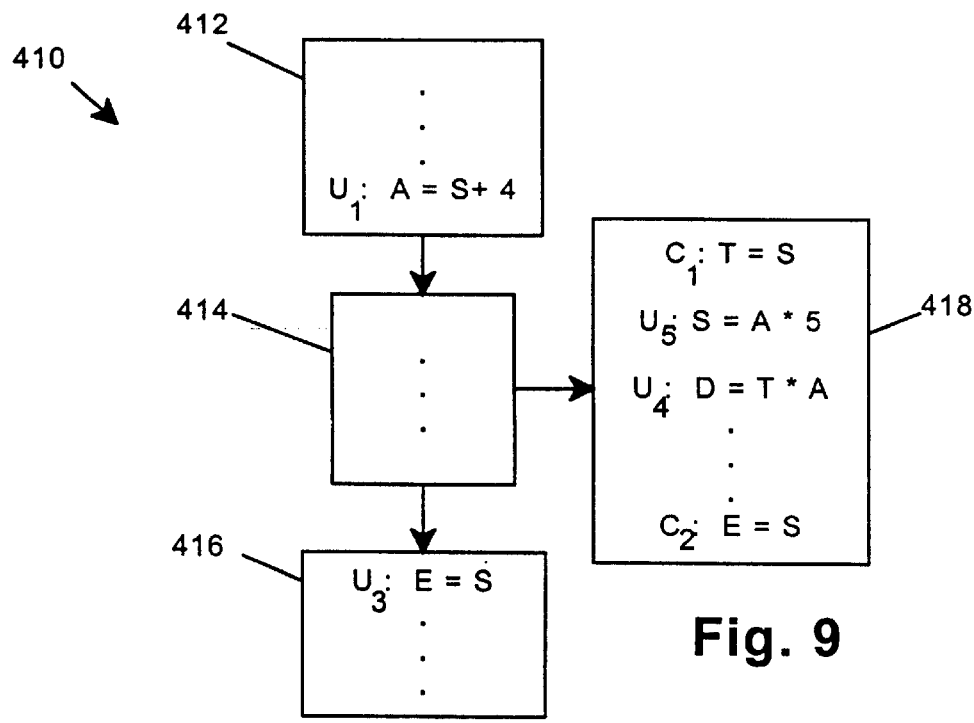
Figure 10:
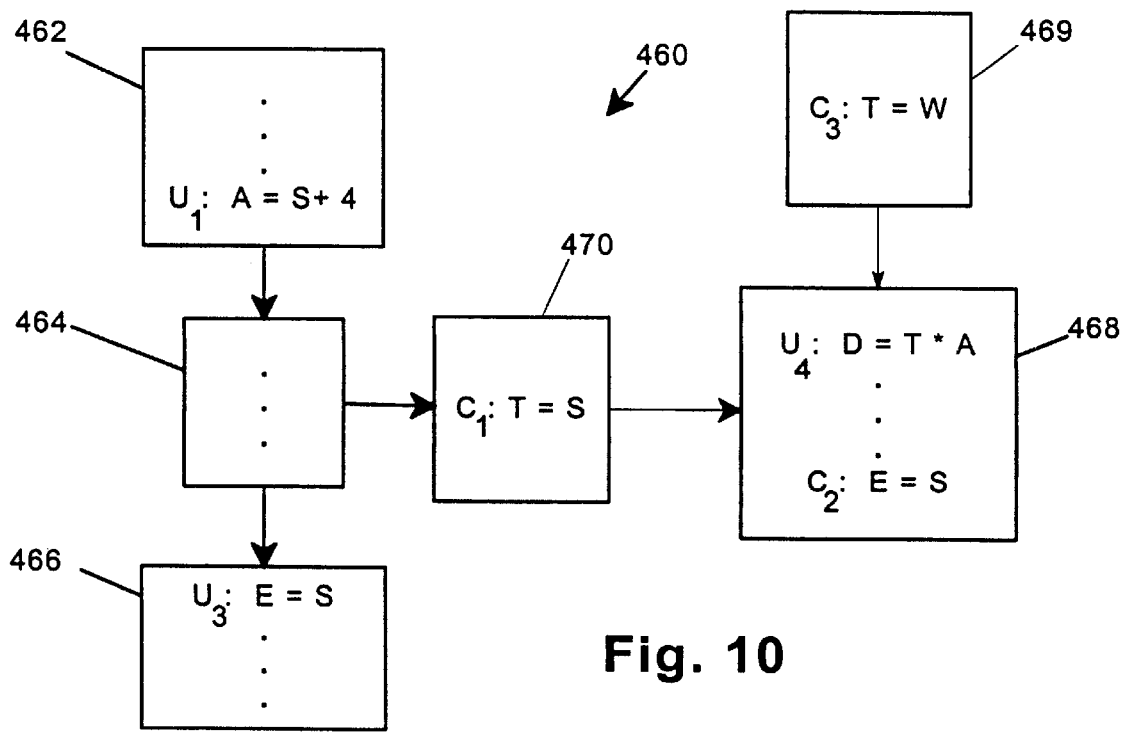

Referring now to FIGS. 8, 9 and 10, the results achieved by the partial copy propagation routine of FIG. 3 can be illustrated. FIG. 8 illustrates the result of performing copy propagation upon the routine 1 shown in FIG. 5, to produce a routine 400 in which copy statement $C_1$ has been eliminated, and the corresponding use equations $U_1$, $U_2$, $U_3$ and $U_4$ in blocks 2, 4, 6 and 8 have been replaced as shown in blocks 402, 404, 406 and 408. Similarly, FIG. 9 illustrates the result of performing partial copy propagation upon the routine 10 shown in FIG. 6, to produce a routine 410 in which copy statement $C_1$ has been eliminated from its original location (block 12, which becomes block 412) and duplicated into block 418, and the corresponding use equations $U_1$, $U_2$ and $U_3$ in blocks 12, 14 and 16 have been replaced as shown in blocks 412, 414 and 416. Finally, FIG. 10 illustrates the result of performing copy propagation upon the routine 60 shown in FIG. 7, to produce a routine 460 in which copy statement $C_1$ has been eliminated from its original location (block 62, which becomes block 462) and duplicated into a new block 470, and the corresponding use equations $U_1$, $U_2$ and $U_3$ in blocks 62, 64 and 66 have been replaced as shown in blocks 462, 464 and 466.

It will therefore be appreciated that the invention provides significant advantages in terms of optimization of computer procedures during compilation, resulting in better procedure performance. It will also be appreciated that numerous modifications may be made to the disclosed embodiments consistent with the invention. For example, the partial copy propagation techniques disclosed herein may be executed separately from conventional copy propagation, instead of being executed in the same "pass" of compilation. In addition, different initializations may be performed on the working sets analyzed during the routines. Furthermore, other dataflow analysis techniques, e.g., "sparse" dataflow analysis techniques, among others, may be used to determine equivalent data items.

Partial copy propagation techniques may also be used for copies of the form "T=k", where k is a constant. In this case, the source operand k will never be redefined, so there will be no transition points; but transition arcs may still occur. This technique could be termed "partial constant propagation."

Other modifications may be made to the disclosed embodiments without departing from the spirit and scope of the invention. Therefore, the invention lies in the claims hereinafter appended.

What is claimed is:

1. A method of removing copy statements during compilation of a computer procedure, each copy statement including a defined operand and a used operand, the method comprising:
   (a) determining whether the defined operand of a first copy statement in the computer procedure has an eligible reachable use in the computer procedure, and an additional use in the computer procedure that is not eligible; and if so
   (b) removing the first copy statement from the computer procedure;
   (c) duplicating the first copy statement at a location in the computer procedure prior to the additional use that is not eligible; and
   (d) replacing the defined operand of the eligible reachable use with the used operand of the first copy statement.

2. The method of claim 1, further comprising:
   (e) locating a transition point in the computer procedure where the first copy statement becomes unavailable; and
   wherein the first copy statement is duplicated at a location in the computer procedure prior to the transition point.

3. The method of claim 1, further comprising:
   (e) locating a transition arc from a first basic block to a second basic block in the computer procedure, over which the first copy statement becomes unavailable; and
   wherein the first copy statement is duplicated at a location in the computer procedure prior to the second basic block.

4. The method of claim 3, further comprising:
   (f) determining whether the first basic block has more than one successor;
   wherein the first copy statement is duplicated at an end of the first basic block if the first basic block has only one successor.

5. The method of claim 3, further comprising:
   (f) determining whether the first basic block has more than one successor; and if so inserting a new basic block between the first basic block and the second basic block in the computer procedure;
   wherein, if the first basic block has more than one successor, the first copy statement is duplicated in the new basic block, otherwise, the first copy statement is duplicated at an end of the first basic block.

6. The method of claim 1, wherein (a) further comprises locating transitions in the computer procedure, at which the first copy statement becomes unavailable, and (b) through (d) are performed only if the transitions meet defined criteria.

7. The method of claim 1, wherein the used operand in the first copy statement is a constant.

8. A method of compiling a computer procedure, the method comprising:
   (a) optimizing the computer procedure to form an optimized representation, the computer procedure including at least one copy statement, the copy statement including a defined operand and a used operand, the optimizing including:
      (i) determining whether every reachable use of a defined operand of a first copy statement in the computer procedure is an eligible use;
      (ii) replacing the used operand in each eligible use with the used operand in the first copy statement and removing the first copy statement;
      (iii) if (a)(i) is not true, duplicating the first copy statement at one or more locations in the computer procedure prior to each use that is not eligible; and
   (b) generating an object code representation of the computer procedure from the optimized representation.

9. The method of claim 8, further comprising, prior to the optimizing (a), generating an intermediate representation from a source code representation of the computer procedure.

10. The method of claim 8, wherein (a)(iii) further comprises locating a transition point in the computer procedure where the first copy statement becomes unavailable; and duplicating the first copy statement at a location in the computer procedure prior to the transition point.

11. The method of claim 8, wherein (a)(iii) further comprises locating a transition arc from a first basic block to a second basic block in the computer procedure, over which the first copy statement becomes unavailable; and duplicating the first copy statement at a location in the computer procedure prior to the second basic block.

12. The method of claim 8, wherein the used operand in the first copy statement is a constant.

13. A computer system for compiling a computer procedure into a machine-readable representation, the computer procedure including at least one copy statement that includes a defined operand and a used operand, the computer system comprising:
   (a) an optimizer that optimizes the computer procedure into an optimized representation, the optimizer including a copy statement eliminating module that (i) identifies whether the defined operand in a first copy statement in the computer procedure has an eligible use and an additional use that is not eligible, and (ii) if so, removes the first copy statement, replaces the used operand at the eligible use with the used operand in the first copy statement, and duplicates the first copy statement prior to each use that is not eligible; and
   (b) a machine-readable code generator that generates a machine-readable representation of the computer procedure from the optimized representation.

14. The computer system of claim 13, further comprising a front end module that generates an intermediate representation from a source code representation of the computer procedure, wherein the optimizer operates on the intermediate representation of the computer procedure.

15. The computer system of claim 13, wherein the optimizer locates a transition point in the computer procedure where the first copy statement becomes unavailable; and duplicates the first copy statement at a location in the computer procedure prior to the transition point.

16. The computer system of claim 13, wherein the optimizer locates a transition arc from a first basic block to a second basic block in the computer procedure, over which the first copy statement becomes unavailable; and duplicates the first copy statement at a location in the computer procedure prior to the second basic block.

17. The computer system of claim 13, wherein the used operand in the first copy statement is a constant.

18. A program product, comprising:
   (a) a program configured to perform a method of compiling a first computer procedure into a second computer procedure, the first computer procedure including at least one copy statement that includes a defined operand and a used operand, the method comprising:
      (i) identifying whether a first copy statement in the intermediate representation has an eligible use in the first computer procedure and an additional use in the first computer procedure that is not eligible; and (ii) if (i) is true, removing the first copy statement, replacing the used operand at the eligible use with the used operand in the first copy statement, and duplicating the first copy statement prior to each use that is not eligible; and (b) a signal bearing media bearing the program.

19. The program product of claim 18, wherein the method performed by the program further comprises locating a transition point in the computer procedure where the first copy statement becomes unavailable; and duplicating the first copy statement at a location in the computer procedure prior to the transition point.

20. The program product of claim 18, wherein the method performed by the program further comprises locating a transition arc from a first basic block to a second basic block in the computer procedure, over which the first copy statement becomes unavailable; and duplicating the first copy statement at a location in the computer procedure prior to the second basic block.

21. The program product of claim 18, wherein the signal bearing media is a transmission type media.

22. The program product of claim 18, wherein the signal bearing media is a recordable media.

23. The program product of claim 18, wherein the used operand in the first copy statement is a constant.

* * * * *